UNITED STATES PATENT OFFICE.

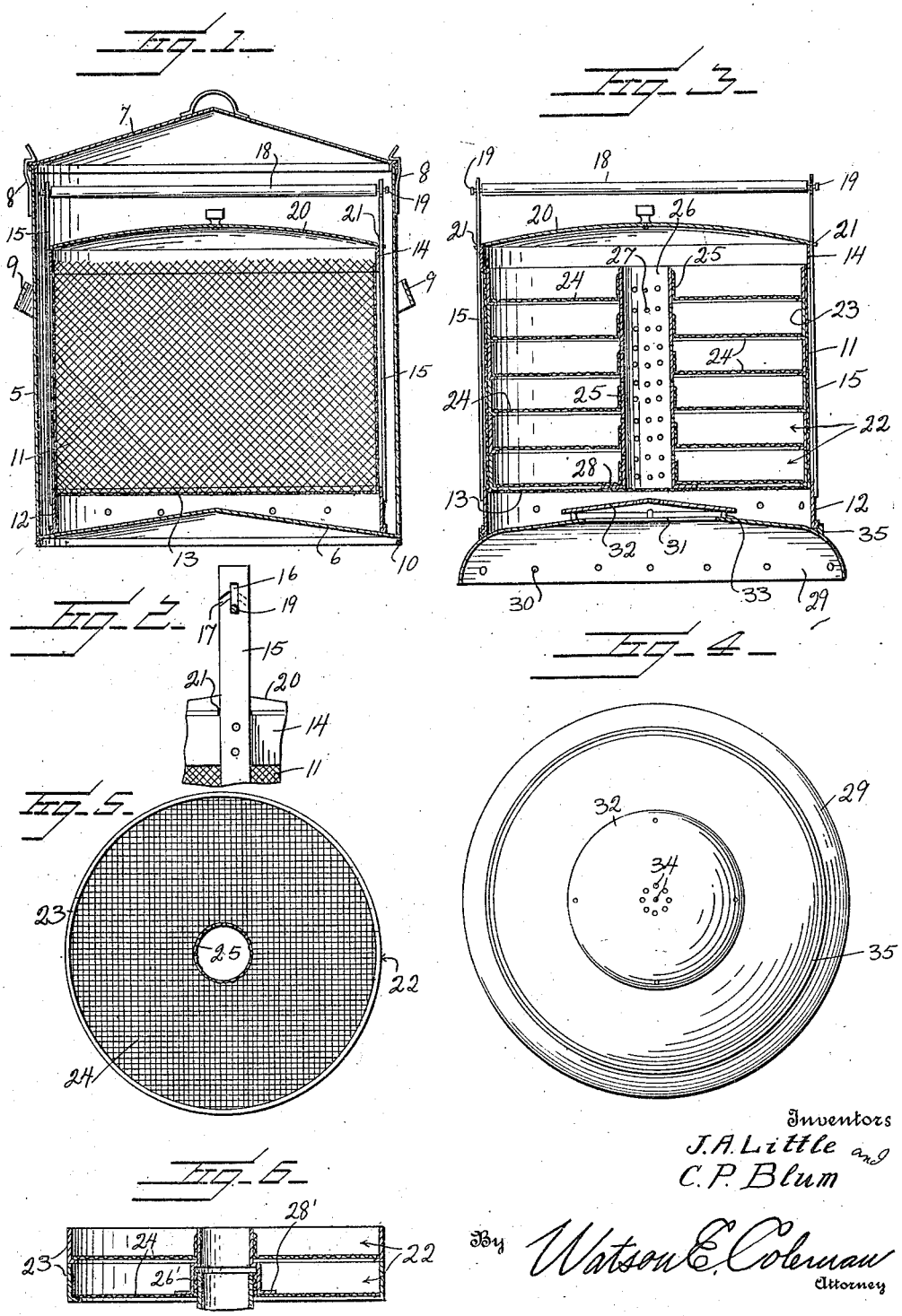

JAMES ALFRED LITTLE AND CARL PETER BLUM, OF BISMARCK, NORTH DAKOTA.

CANNING AND DRYING APPARATUS.

1,301,286.  Specification of Letters Patent.  Patented Apr. 22, 1919.

Application filed August 7, 1918. Serial No. 248,801.

*To all whom it may concern:*

Be it known that we, JAMES A. LITTLE and CARL P. BLUM, citizens of the United States, residing at Bismarck, in the county of Burleigh and State of North Dakota, have invented certain new and useful Improvements in Canning and Drying Apparatus, of which the following is a specification, reference being had to the accompanying drawings.

This invention relates to an improved canning and drying apparatus, and has for its primary object to provide an apparatus primarily designed for domestic use whereby fruits and vegetables may be blanched, steamed, dried, or otherwise processed and also canned in an expeditious manner and with a minimum of manual labor.

It is one of the important objects of the present invention to provide an improved construction of the container or receptacle in which the jars or cans are placed and a cover therefor which is so constructed that displacement of the cover is obviated and the upward rush of steam from the container prevented when the container is removed from the canning boiler.

It is also one of the objects of our invention to provide improved means for effecting a uniform distribution of heat throughout the interior of the container or receptacle for the purpose of drying fruits or vegetables disposed therein.

The invention likewise has for one of its detail objects the provision of a series of fruit or vegetable receiving trays of improved form, and means for retaining the trays in assembled, superposed relation to each other within the receptacle and holding said trays against relative, shifting movement, said means also operating as a heat distributer.

It is a further detail object of the invention to provide a handle for the receptacle or container, and means for easily and quickly attaching or detaching said handle, whereby the container may be easily lifted and placed within the canning boiler and said handle then removed.

With the above and other objects in view, the invention consists in the improved construction, combination and relative arrangement of the various parts as will be hereinafter more fully described, subsequently claimed and illustrated in the accompanying drawing in which similar reference characters designate corresponding parts throughout the several views, and wherein:—

Figure 1 is a vertical sectional view through the canning boiler showing the can or jar holding receptacle arranged therein and constructed in accordance with one embodiment of our invention;

Fig. 2 is a detail side elevation showing the manner of attaching the removable handle to the receptacle;

Fig. 3 is a vertical sectional view showing the arrangement of the parts when the receptacle is used for the purpose of drying fruits or vegetables;

Fig. 4 is a top plan view of the heat retaining base and deflector;

Fig. 5 is a top plan view of one of the removable trays; and

Fig. 6 is a detail section illustrating a slight modification of the device.

Referring in detail to the drawing, 5 designates the canning boiler, preferably constructed of galvanized sheet metal and having a concave bottom wall 6 to afford a maximum heating surface. This boiler is provided with a cover 7 having an annular flange to frictionally engage within the upper end of the boiler. Spring clips, indicated at 8, are fixed to the wall of the boiler and are adapted for engagement over an outwardly projecting bead on the cover 7, whereby said cover is tightly held in its closed position. Suitable handles, indicated at 9, are fixed to the boiler wall at diametrically opposite sides thereof. A metal ring or annulus 10 is preferably fixed to the lower edge of the boiler so as to support the boiler upon the grill of a gas or oil stove over the burner thereof with the bottom wall 6 in close proximity to the flame.

A can or jar receiving receptacle is adapted to be used in conjunction with the boiler 5, and said receptacle is preferably constructed with a woven wire body wall 11, the lower edge of which is secured to and reinforced by an annular metal band 12, to which the woven wire bottom wall 13 of the receptacle is also secured. The wall 11 is likewise preferably reinforced at its upper edge by the annular metal band 14 to which vertically disposed arms 15 are securely riveted at diametrically opposite sides thereof. Each of these arms is provided in its upper end with a longitudinally extending slot 16 and a laterally inclined entrance 17 centrally communicating with the said slot. These entrances 17 open upon the relatively opposite side edges of the arms 15. 18 designates a handle member preferably consisting of a straight, wood bar having headed studs or pins 19 fixed in its opposite ends. These pins are adapted for engagement through the entrances 17 in the respective arms 15 and in the slots 16 in said arms.

20 designates a suitable cover for the receptacle. This cover is of slightly greater diameter than the diameter of the receptacle and is provided in its perimeter, and at diametrically opposite points, with notches or recesses 21 to accommodate the arms 15. These arms, by frictional engagement with the cover, serve to securely retain the cover in its applied position.

A series of trays 22 are adapted to be removably arranged within the receptacle in superposed relation to each other. Each of these trays has an annular marginal wall 23 to which a woven wire bottom wall 24 is suitably secured at its outer edge. This wire bottom wall is formed with a central, upstanding neck 25 surrounding a central opening in said wall. In order to retain these several trays in proper superposed relation and hold them against relative, shifting movement, I preferably employ a cylindrical sheet metal flue 26, which is perforated throughout its length, as at 27. This flue, at its lower end, is formed with an outwardly projecting, annular flange 28 to rest upon the wire bottom wall 13 of the receptacle. The flue 26 extends through the central upstanding necks 25 of the several trays. If desired, however, this flue may be constructed in two or more sections, as shown in Fig. 6 of the drawing, so that when the receptacle is not completely filled with the trays, a relatively short flue may be employed. When other trays are to be inserted, a flue section having a diametrically enlarged end 26' may be engaged over the neck 25 of the uppermost tray and the end of the flue section which is disposed therein. This enlarged end 26' of the flue section is preferably formed with a flange 28' to rest upon the bottom wall of the tray. It is also to be understood, however, that the device may be used with entire satisfaction without necessarily employing the perforated flue extending through the superposed trays and the use of such flues may be dispensed with if desired.

29 designates a heat retaining dome-shaped base, preferably constructed of sheet metal and having spaced air inlet openings 30 adjacent to its lower edge. The wall of this base 29 is centrally formed with an opening 31 and has a slightly concavo-convex deflecting plate 32 disposed above said opening and in spaced relation to the wall of the base. Preferably, suitable brackets 33 are fixed at spaced points to the deflecting plate adjacent its outer edge and to the base wall at the edge of the opening 31. This heat deflecting plate 32 is provided in its central portion with the perforations 34 so as to permit of the direct upward flow of a portion of the heat. The wall of the base 29 is further exteriorly provided with an annular supporting flange or rib 35 upon which the lower edge of the metal band 12, which extends some distance below the bottom wall 13, is adapted to be seated. I have above referred to the receptacle and the trays as provided with the woven wire walls, but it is, of course, apparent that in lieu thereof, foraminous sheet metal walls may be used.

In the use of the apparatus, the receptacle may be employed to hold fruit jars, covers and sealing rubbers during the process of sterilization, or to hold the fruits and vegetables arranged in the trays which are positioned in the receptacle, as above explained, for the purpose of blanching, steaming or dipping the fruits or vegetables in cold water, and also to receive the filled jars of canned fruits or vegetables in the final processing thereof. After the jars have been filled and placed within the receptacle, the cover 20 is applied and the handle 18 attached. The receptacle with its contents may then be readily lifted and inserted within the canning boiler 5. The handle 18 can then be removed or permitted to remain in place, as desired, and the cover 7 applied to the boiler. After processing, the handle 18 may be again applied and the receptacle readily removed from the boiler. The cover 20 effectually prevents the upward rush of steam from the receptacle when the boiler cover is removed. By the provision of the spring clips for retaining the boiler cover in place, the requisite steam pressure within the boiler may be obtained, resulting in increased heat, whereby the canning process is expedited.

When the apparatus is used for the purpose of drying fruits or vegetables, the base 29 is arranged over the flame of a gas stove or oil stove burner, and the receptacle, together with the trays arranged therein filled with the fruits or vegetables, is placed in position upon said base, said receptacle being supported by the rib 35 with its bottom wall 13 slightly spaced from the deflecting plate 32. The heat rising from the burner will pass upwardly through the perforations 34 in the plate 32 and also laterally between the edge of said plate and the wall of the base 29. The heat will thus be evenly distributed beneath the bottom wall 13 of the receptacle and will flow upwardly through the central, perforated flue 26 and also through the several superposed trays. The heat flowing upwardly through the flue, passes outwardly from the perforated wall in lateral directions and into the several trays. Thus, there is a very even distribution of the heat to the contents of the several trays so that the fruits or vegetables will be rapidly dried. The apparatus can thus be used as a drier with a minimum consumption of fuel and at correspondingly small expense.

From the foregoing description, taken in connection with the accompanying drawing, it is believed that the construction, manner of operation and several advantages of our improved canning and drying apparatus will be clearly and fully understood. The several parts above described are quite simple in form so that the entire apparatus can be manufactured and sold at comparatively small cost. The device will preferably be manufactured in such size that it can be used upon one burner of a gas, oil or electric stove, or one hole of a coal range. It is, however, to be understood that the apparatus may be constructed in larger sizes, if desired, and the form, shape and relative proportions of its several parts greatly varied. We have found the apparatus, as herein described, very satisfactory and serviceable in practical use, but in the practical development of the device, it is to be understood that we reserve the privilege of adopting all such legitimate modifications in the several structural features herein referred to as may be fairly embodied within the spirit and scope of the invention as claimed.

We claim:—

1. In an apparatus of the character described, a receptacle having a foraminous bottom wall, a series of trays adapted to be arranged within said receptacle, each tray having a foraminous bottom wall and a central opening therein, and a heat distributing flue having a perforated wall extending through the openings in the several trays.

2. In an apparatus of the character described, a receptacle having foraminous side and bottom walls, a series of trays adapted to be arranged in superposed relation within said receptacle and each having a foraminous bottom wall provided with a central opening, a foraminous upstanding neck at the edge of said opening, and heat distributing means adapted to be arranged within the receptacle and extending through the necks of said trays.

3. In an apparatus of the character described, a receptacle having foraminous side and bottom walls, a series of trays adapted to be arranged in superposed relation within said receptacle and each having a foraminous bottom wall provided with a central opening, a foraminous upstanding neck at the edge of said opening, and a heat distributing flue having a perforated wall extending through the necks of the several trays, said flue having a flange at one end to rest upon the bottom wall of the receptacle.

4. In an apparatus of the character described, a receptacle having foraminous side and bottom walls, a series of trays adapted to be arranged in superposed relation within said receptacle and each having a foraminous bottom wall provided with a central opening, a foraminous upstanding neck at the edge of said opening, a heat distributing flue having a perforated wall extending through the necks of the several trays, said flue having a flange at one end to rest upon the bottom wall of the receptacle, arms fixed to the body wall of the receptacle at diametrically opposite sides thereof, and a cover to close the upper end of the receptacle having notches in its perimeter to receive said arms.

5. In an apparatus of the character described, in combination with a receptacle having a foraminous bottom wall, a heat retaining base provided with an opening in its wall and having means to support said receptacle upon the base with its bottom wall in spaced relation to said opening, and heat deflecting means mounted upon said base over the opening in the wall thereof to laterally deflect the heat and uniformly distribute the same upwardly through the bottom wall of the receptacle.

6. In an apparatus of the character described, in combination with a receptacle having a foraminous bottom wall, a heat retaining base provided with an opening in its wall and having means to support said receptacle upon the base with its bottom wall in spaced relation to said opening, and a heat deflecting plate disposed in spaced relation to the base above the opening in the wall thereof, the central portion of said plate being perforated to permit of the direct upward flow of a portion of the heat from said base through the receptacle.

7. A receptacle including a body, a cover for the open end of the body of greater diameter than the receptacle, said cover having notches in its perimeter at diametrically opposite points, arms fixed to the body wall of the receptacle at opposite sides thereof and adapted for engagement in said notches to retain the cover in its applied position, a handle, and means for detachably connecting the handle to said arms.

In testimony whereof we hereunto affix our signatures in the presence of two witnesses.

JAMES ALFRED LITTLE.
CARL PETER BLUM.

Witnesses:
LEOTA HENDERSHOTT,
BESSIE K. REMPEL.